US012755487B2

(12) United States Patent
Richwagen et al.

(10) Patent No.: US 12,755,487 B2
(45) Date of Patent: Oct. 6, 2026

(54) SYSTEMS AND METHODS FOR EMERGENCY RESPONSE MAPPING AND VISUALIZATION IN THREE DIMENSIONS USING ORTHOGRAPHIC PROJECTION INFORMATION

(71) Applicant: FNV IP B.V., Leidschendam (NL)

(72) Inventors: Justin Scott Richwagen, Frederick, MD (US); Simon David New, Houston, TX (US); Michael Brian Wernau, Leesburg, VA (US); Azhar Saleh Ibrahim, Brunswick, MD (US); Guy William Meiron, Boonsboro, MD (US); Keith Owens, Boonsboro, MD (US)

(73) Assignee: FNV IP B.V., Leidschendam (NL)

( * ) Notice: Subject to any disclaimer, the term of this patent is extended or adjusted under 35 U.S.C. 154(b) by 139 days.

(21) Appl. No.: 18/393,427

(22) Filed: Dec. 21, 2023

(65) Prior Publication Data

US 2025/0209742 A1 Jun. 26, 2025

(51) Int. Cl.

*G06T 17/05* (2011.01)
*G01C 21/00* (2006.01)
*G06T 7/73* (2017.01)
*G06T 15/20* (2011.01)

(52) U.S. Cl.

CPC .......... *G06T 17/05* (2013.01); *G01C 21/3867* (2020.08); *G06T 7/74* (2017.01); *G06T 15/20* (2013.01); *G06T 2207/10028* (2013.01); *G06T 2210/04* (2013.01)

(58) Field of Classification Search

None

See application file for complete search history.

(56) References Cited

U.S. PATENT DOCUMENTS

2018/0140197 A1* 5/2018 Wang .................. A61B 5/0077
2021/0125397 A1* 4/2021 Moulon .................. G06T 17/00
2021/0375062 A1* 12/2021 Fleischman ............. G06F 18/24
2022/0157021 A1* 5/2022 Yu .......................... G08G 1/146
2024/0087254 A1* 3/2024 Juarez ................... H04W 4/029
2024/0233260 A1* 7/2024 Cier ..................... G01C 21/383

* cited by examiner

*Primary Examiner* — Frank S Chen

(74) *Attorney, Agent, or Firm* — Polsinelli PC

(57) ABSTRACT

The present disclosure is directed to systems and techniques for mapping and visualization. A process can include identifying a building of interest, wherein the building of interest is associated with an incident or incident report. A particular floor within the building of interest can be determined, wherein the particular floor is included in one or more floors of the building of interest. A top-down view two-dimensional (2D) orthographic projection of three-dimensional (3D) interior survey data corresponding to the particular floor can be obtained, wherein the top-down view 2D orthographic projection includes one or more visual landmarks. A 3D view of at least a portion of the building of interest can be generated, wherein the 3D view includes an overlay representation of the top-down view 2D orthographic projection of the particular floor.

21 Claims, 7 Drawing Sheets

SYSTEMS AND METHODS FOR EMERGENCY RESPONSE MAPPING AND VISUALIZATION IN THREE DIMENSIONS USING ORTHOGRAPHIC PROJECTION INFORMATION

FIELD

Aspects of the present disclosure generally relate to automated and/or semi-automated mapping and rendering of map data. For example, aspects of the present disclosure are related to using orthographic projections of the interior of a building to automatically render one or more map data views, including for emergency response scenarios.

BACKGROUND

Emergency response services often rely upon location information in coordinating and/or providing a response to various incidents and other emergency scenarios. For example, emergency call center operators and/or dispatchers need basic location information of where an incident has occurred to direct emergency response resources (e.g., police officers, firefighters, ambulances, etc.) to the scene of the incident. Traditionally, emergency response has been coordinated based on a street address, often relayed verbally over the phone to an emergency call center operator.

When location information is obtained verbally in a phone call, errors in communication can occur between the individual who provides the address (e.g., the caller speaking with an emergency call center operator) and the individual who records the address (e.g., the emergency call center operator). Additionally, errors may also occur when an emergency call center operator distributes the address to the appropriate emergency response resources that are selected for dispatch to respond to the emergency at the given address. In many cases, an emergency call center operator must translate a spoken address from a phone call into an electronic representation of the same address that is compatible with one or more back-end systems used to provide emergency response services. For example, these back-end systems can include navigation systems used to route or direct first responders (e.g., police, firefighters, etc.) to the scene of the incident; emergency response management systems utilized to track ongoing and completed incidents, the current allocation of emergency response resources within a service area, etc.; and/or mapping systems that localize the location of the incident (e.g., the spoken address given to the emergency call center operator) within the context of existing map data.

For example, emergency call center operators and dispatchers may utilize one or more mapping resources or mapping databases to provide visualization of the location of a reported incident and/or to improve situational awareness of the incident and the surrounding environment of the incident. For instance, an emergency call center operator or dispatcher may receive a report of a fire at a given address. Based on consulting map data, the emergency call center operator or dispatcher can determine supplemental information that may be used to augment (e.g., improve) the emergency response to the fire. For example, map data can enable determinations such as whether the reported address is the location of a business or a residential building, whether there are any attached or adjacent structures to which the fire may spread, etc. Map data can additionally enable the selection of appropriate streets to close, optimal staging zones for emergency response resources (e.g., an active firefighting zone, a triage or medical assistance zone, etc.), and/or the positioning of emergency response resources near support infrastructure (e.g., positioning firetrucks within range of fire hydrants).

In many cases, emergency call center operators and/or dispatchers rely upon two-dimensional (2D) maps to obtain situational awareness of the location and surrounding environment of an incident. In some cases, emergency call center operators, dispatchers, first responders, and/or other emergency response resources may rely upon physical 2D maps and/or personal geographic knowledge at various stages of coordination and while providing an emergency response. Currently, emergency response services may be seen to be limited to 2D maps and other limited visibility information sources. There thus exists a need for improved systems and techniques for providing immersive and interactive three-dimensional (3D) mapping data and visualizations thereof for emergency response incidents.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for automatically rendering one or more three-dimensional (3D) map data views and/or 3D visualizations for emergency response incidents, using one or more orthographic projections (e.g., among various other types of orthographic projection information) corresponding to an interior of a building. For instance, according to at least one illustrative example, a method can include: identifying a building of interest, wherein the building of interest is associated with an incident or incident report; determining a particular floor within the building of interest, wherein the particular floor is included in one or more floors of the building of interest; obtaining a top-down view two-dimensional (2D) orthographic projection of three-dimensional (3D) interior survey data corresponding to the particular floor, wherein the top-down view 2D orthographic projection includes one or more visual landmarks; and generating a 3D view of at least a portion of the building of interest, wherein the 3D view includes an overlay representation of the top-down view 2D orthographic projection of the particular floor.

In some aspects, the generated 3D view is outputted in response to a request for visualization information or orientation information for determining a location of the incident.

In some aspects, location information is received indicative of the location of the incident within the particular floor, wherein the location information is based on one or more of the visual landmarks included in the overlay representation of the top-down view 2D orthographic projection.

In some aspects, the top-down view 2D orthographic projection is obtained based on using an identifier of the particular floor to query a database, wherein the database includes a respective top-down view 2D orthographic projection corresponding to each floor of the one or more floors of the building of interest.

In some aspects, obtaining the top-down view 2D orthographic projection comprises: obtaining one or more portions of 3D scan or 3D mapping data corresponding to the particular floor, wherein the one or more portions of 3D scan or 3D mapping data comprise the 3D interior survey data; and performing orthographic projection of the one or more portions of 3D scan or 3D mapping data onto a 2D projection plane to thereby generate the top-down view 2D orthographic projection.

In some aspects, the 2D projection plane is a horizontal plane parallel to a floor surface of the particular floor represented in the one or more portions of 3D scan or 3D mapping data.

In some aspects, the 2D projection plane is a horizontal plane coplanar with a floor surface of the particular floor represented in the one or more portions of 3D scan or 3D mapping data.

In some aspects, the top-down view 2D orthographic projection is generated from a portion of the 3D interior survey data associated with respective 3D height coordinates less than or equal to a configured threshold height value.

In some aspects, the configured threshold height value is equal to a ceiling height for the particular floor within the building of interest.

In some aspects, the portion of the 3D interior survey data excludes 3D points or 3D data associated with light fixtures or ceiling-mounted objects represented in the 3D interior survey data.

In some aspects, identifying the building of interest is based on a determination that the building of interest corresponds to location information associated with an incident.

In another illustrative example, an apparatus is provided. The apparatus includes at least one memory and at least one processor coupled to the at least one memory and configured to: identify a building of interest, wherein the building of interest is associated with an incident or incident report; determine a particular floor within the building of interest, wherein the particular floor is included in one or more floors of the building of interest; obtain a top-down view two-dimensional (2D) orthographic projection of three-dimensional (3D) interior survey data corresponding to the particular floor, wherein the top-down view 2D orthographic projection includes one or more visual landmarks; and generate a 3D view of at least a portion of the building of interest, wherein the 3D view includes an overlay representation of the top-down view 2D orthographic projection of the particular floor.

In another illustrative example, a non-transitory computer-readable storage medium comprising instructions stored thereon which, when executed by at least one processor, causes the at least one processor to: identify a building of interest, wherein the building of interest is associated with an incident or incident report; determine a particular floor within the building of interest, wherein the particular floor is included in one or more floors of the building of interest; obtain a top-down view two-dimensional (2D) orthographic projection of three-dimensional (3D) interior survey data corresponding to the particular floor, wherein the top-down view 2D orthographic projection includes one or more visual landmarks; and generate a 3D view of at least a portion of the building of interest, wherein the 3D view includes an overlay representation of the top-down view 2D orthographic projection of the particular floor.

In another illustrative example, an apparatus is provided for wireless communication. The apparatus includes: means for identifying a building of interest, wherein the building of interest is associated with an incident or incident report; means for determining a particular floor within the building of interest, wherein the particular floor is included in one or more floors of the building of interest; means for obtaining a top-down view two-dimensional (2D) orthographic projection of three-dimensional (3D) interior survey data corresponding to the particular floor, wherein the top-down view 2D orthographic projection includes one or more visual landmarks; and means for generating a 3D view of at least a portion of the building of interest, wherein the 3D view includes an overlay representation of the top-down view 2D orthographic projection of the particular floor.

Aspects generally include a method, apparatus, system, computer program product, non-transitory computer-readable medium, user equipment, base station, wireless communication device, and/or processing system as substantially described herein with reference to and as illustrated by the drawings and specification. The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution. Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof. In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are therefore not to be considered to be limiting of its scope, the principles herein are described and explained with additional specificity and detail through the use of the accompanying drawings in which.

DETAILED DESCRIPTION

Figure 1A:
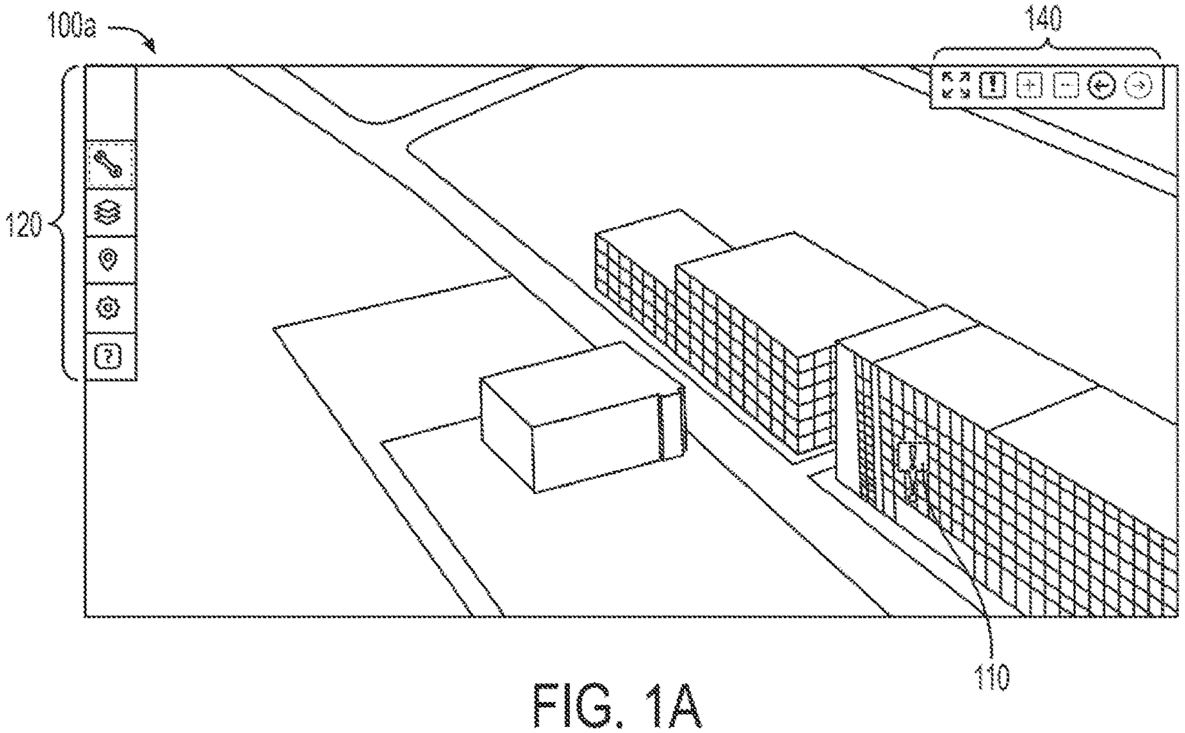
FIG. 1A is a diagram illustrating an example user interface of a three-dimensional (3D) mapping emergency response planning and coordination system, according to embodiments of the present disclosure.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Example 3D Mapping and Visualization System

As noted previously, aspects of the present disclosure can generally relate to the automated and/or semi-automated mapping and rendering of map data, including three-dimensional (3D) and/or two-dimensional (2D) map data associated with one or more buildings and/or an emergency response scenario. Described below is an example of a 3D mapping and visualization system for emergency response scenarios, which in at least some embodiments, aspects of the present disclosure may be implemented. The example 3D mapping and visualization system is described below with respect to FIGS. 1-3, and in in at least some embodiments may be the same as or similar to the 3D mapping and visualization system described in commonly owned U.S. patent application Ser. No. 17/882,406, filed Aug. 5, 2022 for "Systems and methods for emergency response mapping and visualization in three dimensions."

In the context of emergency response scenarios, emergency call center operators and dispatchers may utilize one or more mapping resources or mapping databases to provide visualization of the location of a reported incident and/or to improve situational awareness of the incident and the surrounding environment of the incident. For instance, an emergency call center operator or dispatcher may receive a report of a fire at given address. Based on consulting map data, the emergency call center operator or dispatcher can determine supplemental information that may be used to augment (e.g., improve) the emergency response to the fire. For example, map data can enable determinations such as whether the reported address is the location of a business or a residential building, whether there are any attached or adjacent structures to which the fire may spread, etc. Map data can additionally enable the selection of appropriate streets to close, optimal staging zones for emergency response resources (e.g., an active firefighting zone, a triage or medical assistance zone, etc.), and/or the positioning of emergency response resources near support infrastructure (e.g., positioning firetrucks within range of fire hydrants). In many cases, emergency call center operators and/or dispatchers rely upon two-dimensional (2D) maps to obtain situational awareness of the location and surrounding environment of an incident. In some cases, emergency call center operators, dispatchers, first responders, and/or other emergency response resources may rely upon physical 2D maps and/or personal geographic knowledge at various stages of coordination and while providing an emergency response. Currently, emergency response services may be seen to be limited to 2D maps and other limited visibility information sources, despite the existence of more robust mapping data and mapping information.

The example 3D mapping and visualization system described below with respect to FIGS. 1-3 can be used to provide improved visualization and situational awareness information for implementing emergency response services. For instance, the example 3D mapping and visualization system can be used to provide emergency response resources (e.g., including, but not limited to, emergency call center operators or dispatchers) with immersive three-dimensional (3D) mapping data and various automated (and/or semi-automated) tools that leverage the immersive 3D mapping data to reduce an overall emergency response coordination and planning time.

For example, in some embodiments, one or more sources of 3D mapping data can be utilized to automatically localize a reported incident and generate an immersive and interactive 3D visualization of the reported incident and its surrounding environment. In some cases, some (or all) of the 3D mapping data can be 3D Geographic Information System (GIS) data. In some examples, some (or all) of the 3D mapping data can be obtained from or otherwise supplied by a Computer-Aided Dispatch (CAD) system. The systems and techniques described herein can be implemented in a CAD system, and/or can be used to generate immersive and interactive 3D visualizations for reported incidents in a manner that is streamlined to provide optimal efficiency for emergency response call center operators, dispatchers, and/or other emergency response personnel. The immersive and interactive 3D visualizations described herein can be generated based on minimal user interaction to provide full-fledged and robust situational awareness for a reported incident, as will be described in greater depth below.

FIG. 1A is a diagram illustrating a user interface 100*a* of an example 3D mapping emergency response planning and coordination system, in which aspects of the present disclosure may operate and/or be implemented, according to at least some embodiments. The example user interface 100*a* presents a 3D view of map data that includes an overlaid emergency location indicator 110. In some examples, the overlaid emergency location indicator 110 can be dynamically positioned and repositioned (e.g., as the perspective, orientation, zoom, etc., of the 3D view of map data is changed either automatically or by a user) to indicate the location of a reported emergency or other incident. In one illustrative example, emergency location indicator 110 can be overlaid on the 3D view of map data such that emergency location indicator 110 corresponds to an accurate location of the reported emergency relative to the three-dimensional surrounding environment rendered in the 3D view of map data. For example, in the context of FIG. 1A, emergency location indicator 110 is overlaid to correspond to an accurate location of an incident on the second floor of a building.

Conventionally, emergency response planning and coordinate systems have relied upon only two-dimensional representations of the location of an incident. For example, an incident location may be reported or otherwise represented using a latitude and longitude coordinate (x, y coordinates). However, existing emergency response planning and coordinate systems largely are not seen to introduce a third coordinate or dimension to represent the verticality or height associated with the location of a reported incident. In one illustrative example, the example 3D mapping and visualization system can be used to provide three-dimensional visualization and/or rendering of the location of a reported incident and/or the surrounding environment.

As illustrated in FIG. 1A, the emergency location indicator 110 can be rendered based on a three-dimensional position or coordinate (e.g., x, y, z) corresponding to the location of the reported emergency or incident. As such, emergency location indicator 110 indicates not only the 2D or (x, y) location of a reported incident, but also indicates a height (e.g., along the z-axis) of the reported incident. In the example of FIG. 1A, emergency location indicator 110 can be seen to indicate that the reported incident is located on the second floor of the building. In some cases, providing an interactive (e.g., repositionable or otherwise manipulable by the user) 3D visualization or rendering of an emergency response scene/location can improve the efficiency and response time associated with providing emergency response services, particularly in dense urban environments where buildings with multiple floors are more common.

Figure 1B:
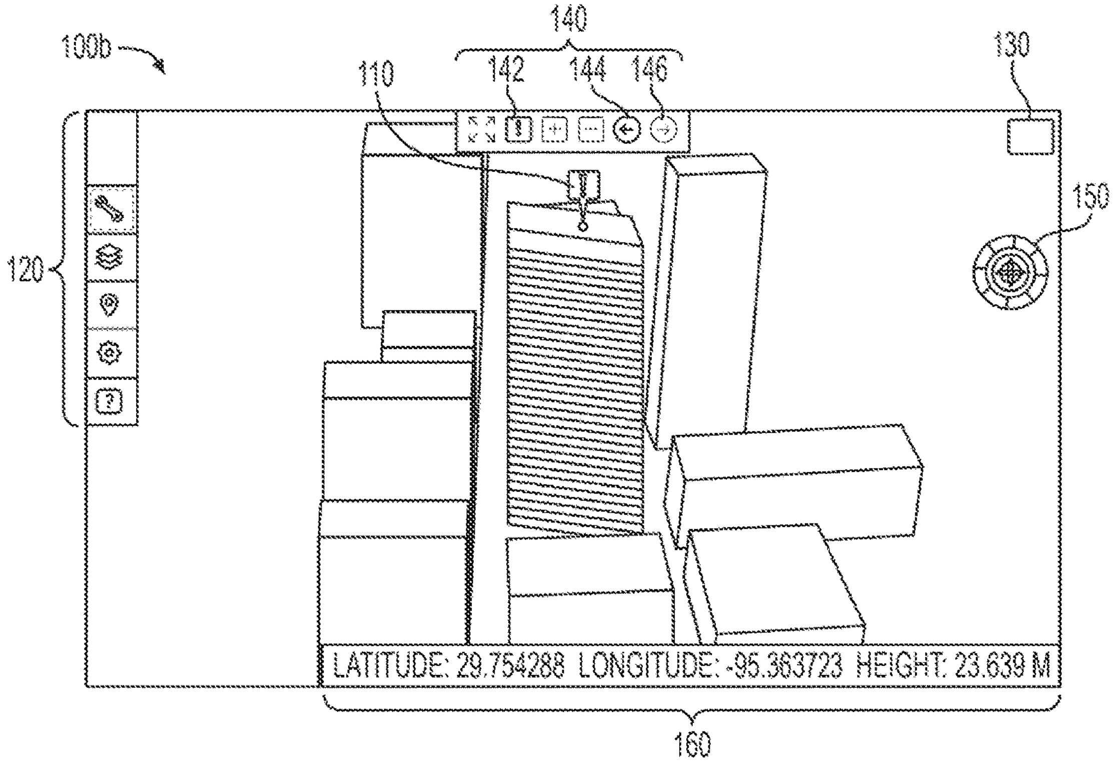
FIG. 1B is another diagram illustrating an example user interface of a 3D mapping emergency response planning and coordination system, according to embodiments of the present disclosure.

In some examples, the example 3D mapping and visualization system may be utilized in both residential or low verticality environments (e.g., such as neighborhoods or low-rise building environments such as that depicted in FIG. 1A, or terrain obstacles such as hills, slopes, retaining walls, and other natural/artificial 3D intrusions that may not be identifiable in a 2D visualization) and in dense urban or high verticality environments (e.g., such as city centers or high-rise building environments such as that depicted in FIG. 1B). For example, in the context of the high-rise environment shown in FIG. 1B, the emergency response indicator 110 can be positioned to indicate the building in which a reported incident is located. As will be described in greater depth below with respect to FIG. 2, the primary emergency response indicator 110 of FIG. 1B can be supplemented with a secondary emergency response indicator 214 that indicates the precise 3D location of a reported incident.

As illustrated in FIGS. 1A and 1B, the example user interfaces 100*a* and 100*b*, respectively, can include one or more interactive user interface (UI) or control elements for manipulating the 3D visualization of the emergency response area associated with emergency response indicator 110. For example, the user interfaces 100*a*, 100*b* can include a user control panel 120 comprising a plurality of user control elements and can include a navigation control panel 140 comprising a plurality of navigation control elements. In some cases, user control panel 120 and the associated plurality of user control elements can be used to annotate or mark-up the rendered 3D environment map data.

For example, the user control panel 120 can include user control elements that provide functionality such as viewing individual floors and/or floor plans of multi-story buildings (e.g., described with respect to FIGS. 2 and 3), making one or more measurements of the physical environment represented in the rendered 3D view, generating and visualizing one or more safety zones, generating and visualizing one or more collapse zones, viewing or disabling one or more supplemental or augmented information layers, searching for and/or saving one or more addresses or real-world locations, etc. (e.g., including, but not limited to, as described in commonly owned U.S. patent application Ser. No. 17/882,406).

The navigation control panel 140 can include navigation control elements that provide functionalities such as manipulating the rendered 3D view that is presented in the example user interfaces 100*a*, 100*b*. For example, navigation control panel 140 can include a plurality of navigation control elements that provide quick access to a project extent, event (e.g., incident) locations, previous camera locations or rendered views from the current session, etc. For instance, with respect to FIG. 1B, in one illustrative example the navigation control panel 140 can include an incident location navigation control element 142, a camera location/rendered view backward step navigation control element 144, and a camera location/rendered view forward step navigation control element 146.

In some examples, the incident location navigation control element 142 can be used to automatically zoom to or fly to a rendered view of the 3D environment surrounding the location of a reported incident (e.g., surrounding the location of emergency response indicator 110). In some cases, the incident location navigation control element 142 can automatically zoom or fly to a rendered 3D view that presents a full-frame visualization of the reported incident. For example, a zoom level triggered by user selection of incident location navigation control element 142 can be determined based on a height of the reported incident location or a total building height of the building in which the reported incident location is located (e.g., a greater zoom level can be triggered when the reported incident location is in a one or two-story residential home, and a lesser zoom level can be triggered when the reported incident location is in a 50 story office tower such as that illustrated in FIG. 1B).

In some examples, a base map layer selection element 130 can be included to permit a user to toggle or otherwise select between various different map data sources from which the rendered 3D view is to be generated. For example, the user interfaces 100*a* and 100*b* depict scenarios in which the selected map data source (e.g., selected using base map layer selection element 130) is a high-resolution satellite or aerial imagery data source. In some examples, base map layer selection element 130 can be used to select between additional map data sources that can include, but are not limited to, terrain or topographical map data, street map data, infrastructure and utility map data (e.g., showing infrastructure such as sewers, water mains/pipes, electrical transmission lines, train tracks, transit lines or routes, etc.), weather data, etc. In some cases, base map layer selection element 130 can be used to select between different providers of a same type of map data. For example, a user may select between multiple different providers of satellite or aerial imagery for the same given area (e.g., for the area depicted in the rendered 3D scene). In some cases, base map layer selection element 130 can be automatically populated with the various layers and/or map data sources that are available for the currently depicted location in the rendered 3D view.

In some examples, a compass navigation control element 150 can be provided for adjusting the point of view (POV) of the rendered 3D scene. For example, an outer ring of compass navigation control element 150 can be rotated to control the North-South orientation of the rendered 3D scene (e.g., rotating the outer ring counter-clockwise can cause the rendered 3D scene to change from an orientation in which North is up to an orientation in which West is up, etc.; rotating the outer ring clockwise can cause the rendered 3D scene to change from an orientation in which North is up to an orientation in which East is up, etc.). Compass navigation control element 150 can further include an inner rotatable navigation element that can be used to control the tilt of the imaginary camera capturing the rendered POV of the 3D scene. For example, FIGS. 1A and 1B depict rendered 3D views that are approximately halfway between a straight-down or bird's eye view POV and a head-on or street level POV. In some examples, a user rotation of the inner rotatable navigation element in a downward direction can increase the tilt of the rendered 3D scene POV (e.g., increases the tilt until a maximum tilt associated with the straight-down, bird's eye view is reached). In some examples, a user rotation of the inner rotatable navigation element in an upward direction can decrease the tilt of the rendered 3D scene POV (e.g., decreases the tilt until a minimum tilt associated with the head-on, street-level view is reached).

Figure 2:
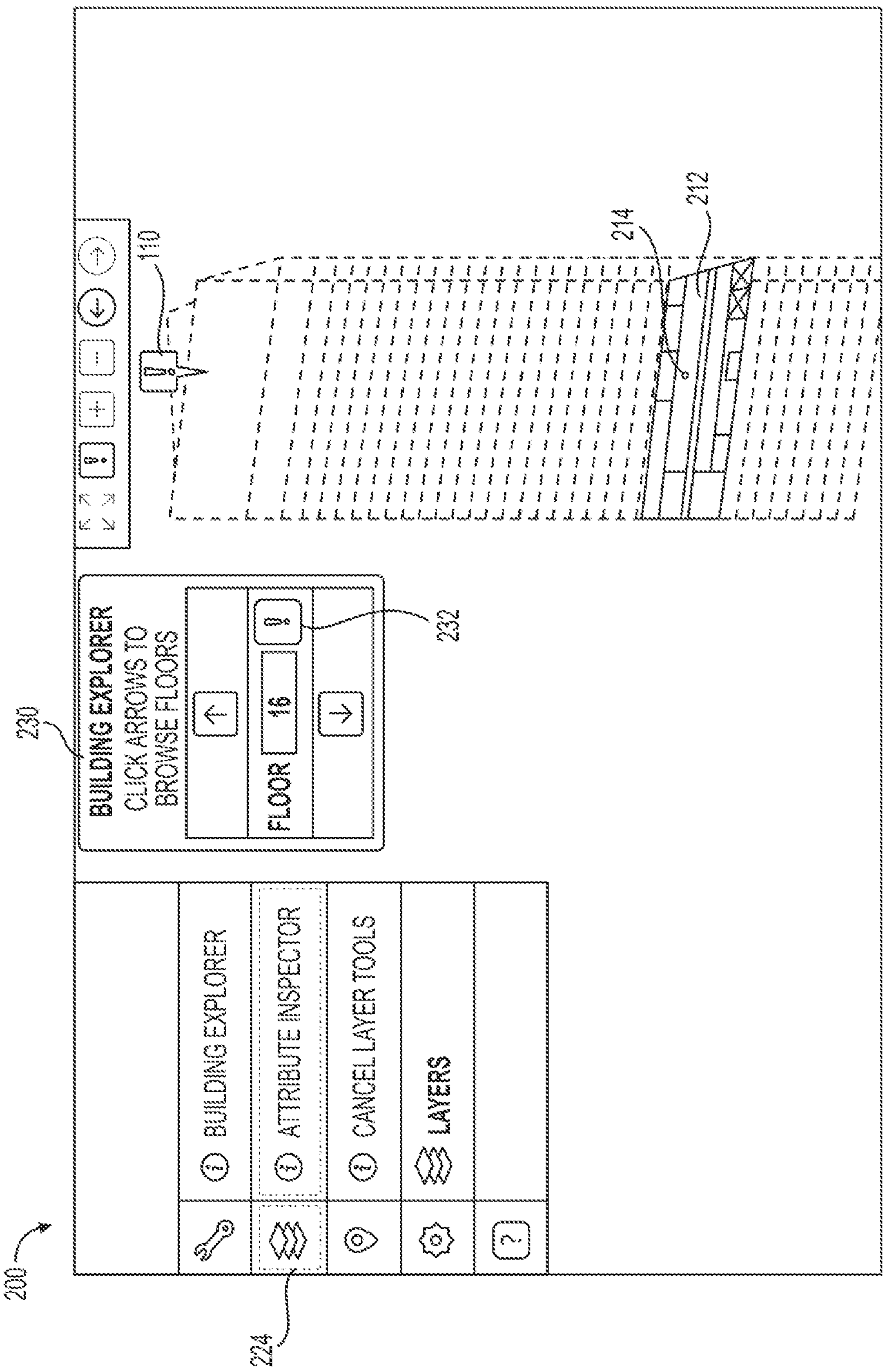
FIG. 2 is a diagram illustrating an example user interface of a vertical explorer tool element of a 3D mapping emergency response planning and coordinate system, according to embodiments of the present disclosure.
Figure 3:
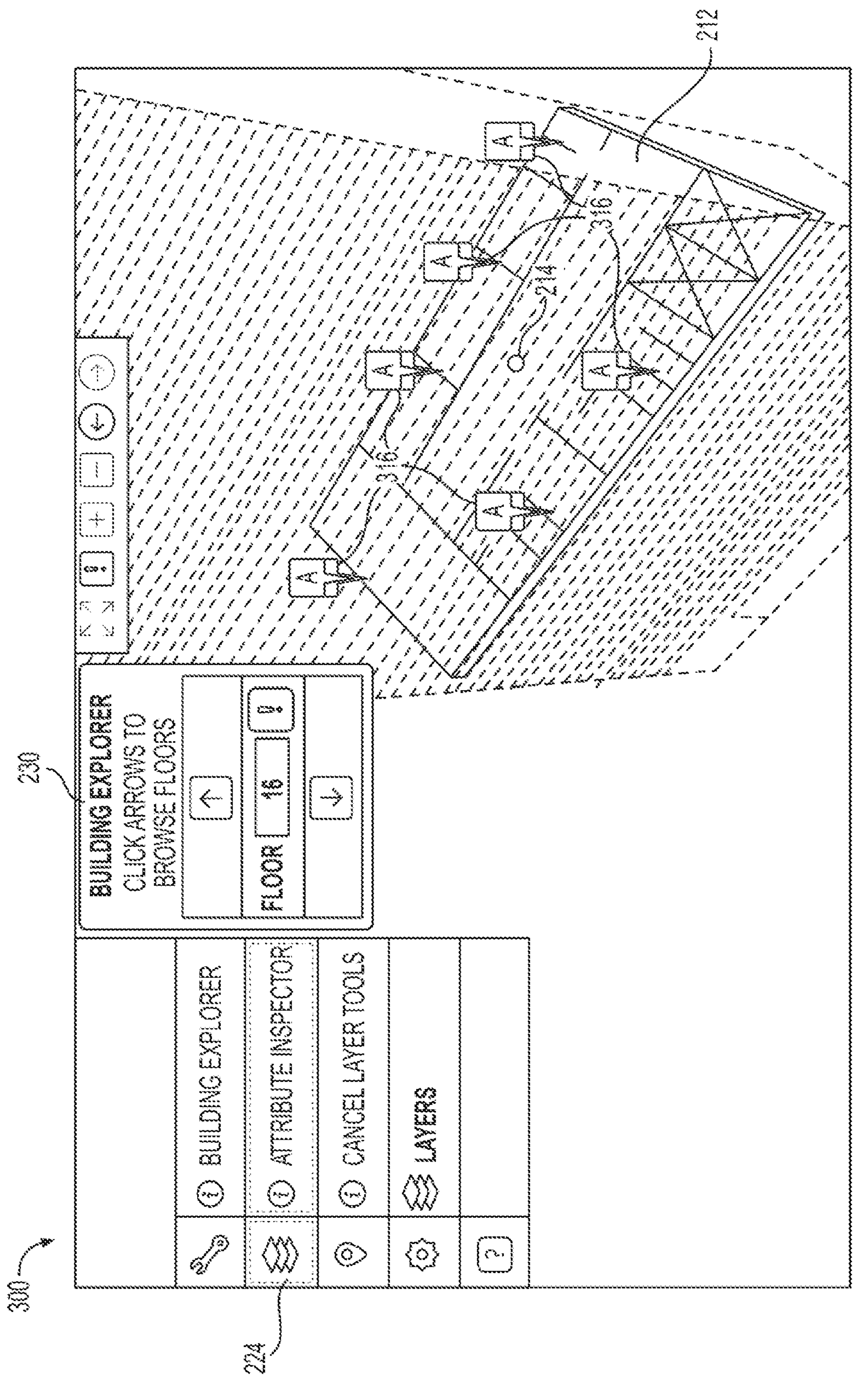
FIG. 3 is a diagram illustrating an example user interface including a rendered floorplan of a selected floor, according to embodiments of the present disclosure.

In some cases, the example 3D mapping and visualization system of FIGS. 1-3 can record, store, or otherwise log the visual movements (e.g., changes to the rendered 3D scene POV) that are input by the user and/or performed automatically. For example, one or more camera parameters or POV rendering parameters can be automatically recorded and stored in response to the rendered 3D view remaining static for at least a pre-determined amount of time. In some cases, the camera or POV rendering parameters associated with the currently presented 3D view of the scene can be automatically recorded and stored based on determining that the rendered 3D view has remained static for at least one second.

Based on recording or logging the visual movements within the rendered 3D scene, a user can backtrack or retrace their previous viewpoints. For example, a user can utilize the camera location/rendered view backward step navigation control element 144 to backtrack through or otherwise retrace previously viewed viewpoints of the rendered 3D scene. Similarly, a user can utilize the camera location/rendered view forward step navigation control element 146 to advance from a previously viewed viewpoint up to the current or most recently viewed viewpoint. In some cases, the backward step navigation control element 144 can be used to implement a visual 'undo' option that allows a user to backtrack by one or more steps from the currently rendered 3D view or POV, and the forward step navigation control element 146 can be used to implement a visual 'redo' option that allows a user to step forward by one or more steps from a previously rendered 3D view or POV.

A coordinate and altitude display 160 can be included in or otherwise implemented by the example 3D mapping and visualization system to display the three-dimensional position (e.g., coordinates) associated with a current position of the user's cursor, finger, other input device, etc. For example, when a user interacts with the example user interface 100*a*, 100*b* via a mouse cursor, the coordinate and altitude display 160 can display the real-world three-dimensional coordinate associated with the location directly underneath the user's mouse cursor. As illustrated, the real-world three-dimensional coordinate can include a latitude, longitude pair and an altitude, although it is noted that other coordinate systems may also be utilized without departing from the scope of the present disclosure.

FIG. 2 is a diagram illustrating a user interface 200 of a vertical explorer tool element of the example 3D mapping emergency response planning and coordinate system. In some aspects, the underlying 3D scene depicted in the rendered 3D view of FIG. 2 can be the same as the underlying 3D scene depicted in the rendered 3D view of FIG. 1B (e.g., the underlying 3D scene comprising a downtown city center can be the same in FIGS. 1B and 2, with the two figures presenting different rendered 3D views or POVs of the same downtown city center scene).

As mentioned previously, a primary emergency location indicator 110 can be overlaid on the rendered 3D scene to indicate a location of the reported emergency or incident. For example, the primary emergency location indicator 110 can be overlaid on the rendered 3D scene to indicate the building in which the reported incident is located. In some examples, the primary emergency location indicator 110 can be positioned at the top of the building in which the reported incident is located (e.g., independent of the actual or specific floor/vertical height at which the reported incident is located within the building). In some cases, one or more location indicators (e.g., such as primary emergency location indicator 110, a secondary emergency location indicator 232, and/or other location information displayed for then reported location of an incident, etc.) can be updated dynamically and or in real-time. For example, while the primary emergency location indicator 110 and the secondary emergency location indicator 232 are described with reference to a fixed or static location within the rendered 3D environment, it is noted that this is done for purposes of clarity of explanation. In some cases, one or more (or both) of the primary emergency location indicator 110 and the secondary emergency location indicator 232 can be updated in real-time, based on receiving one or more location information updates that correspond to a reported location of the emergency or incident. In some examples, the location information (and the location information updates) can be received from various external entities, such as cellular network providers/operators, location data entities, etc. In some cases, the location information and/or location information updates can be received as 3D coordinates (e.g., x, y, z; latitude, longitude, altitude; etc.). The example 3D mapping and visualization system can include one or more user interface (UI) options for stepping forward and backward to view the reported location information at different times. For example, each location information update can be logged as a discrete step, to which the user can backtrack as desired (e.g., using step backward and step forward UI elements, the same as or similar to the backward and forward step UI elements 144 and 146 described above). In some cases, the example 3D mapping and visualization system may interpolate between two or more location information points to generate predicted locations at intermediate times for which location information updates were not received.

In some examples, the user control panel 120 can include a layer selection control element 224. In particular, the layer selection control element can include a 'Building Explorer' option that can be selected by the user to open a corresponding 'Building Explorer' interface 230. The Building Explorer interface 230 can also be referred to as a vertical slice selection interface and/or a floor selection interface. In one illustrative example, user selection of the Building Explorer interface 230 can cause one or more (or all) of the 3D buildings included in the rendered 3D view to be rendered as transparent or semi-transparent (e.g., FIG. 2 depicts an example in which the 3D buildings are rendered in semi-transparent fashion).

In some cases, at least the building indicated by the primary emergency location indicator 110 can be rendered in transparent or semi-transparent fashion. Based on the building associated with primary emergency location indicator 110 being rendered as transparent or semi-transparent, the example user interface 200 can further include a rendering of one or more selected floors or vertical slices within the building associated with primary emergency location indicator 110. For instance, example user interface 200 includes a rendered floor 212, shown here as being rendered in solid or opaque fashion. The example user interface 200 can further include a secondary or fine emergency location indicator 214 that depicts the precise 3D location or coordinate (e.g., by providing georeferenced location information) of the reported incident/emergency. In some cases, when the rendered floor 212 is the floor corresponding to the height (e.g., altitude or z-axis coordinate) of the reported incident location, the secondary emergency location indicator 214 can be rendered on (e.g., coplanar with) the surface of the rendered floor 212.

The rendered floor 212 can be user-selected using the Building Explorer interface 230. For example, the Building Explorer interface 230 can include an input field allowing a user to enter (e.g., type) a specific floor number that should be depicted as the rendered floor 212. In some examples, the Building Explorer interface 230 can additionally, or alternatively, include floor selection elements (e.g., up and down arrows) the selection of which causes the level of rendered floor 212 to increase or decrease, respectively, by a pre-determined amount. For example, selection of the up arrow depicted in Building Explorer interface 230 can increase the level of rendered floor 212 by one floor and selection of the down arrow depicted in Building Explorer interface 230 can decrease the level of rendered floor 212 by one floor, etc.

In one illustrative example, user selection of the 'Building Explorer' option from the sub-menu associated with layer selection control element 224 can automatically set the rendered floor 212 to be the same as the floor associated with the location of the reported incident. For example, upon selecting the 'Building Explorer' option, the user is automatically presented with the view of FIG. 2 in which buildings are rendered as semi-transparent, the opaque rendered floor 212 is the floor associated with the location of the reported incident, and a fine-grained emergency location indicator 214 is overlaid to represent the precise 3D location of the reported incident within the 3D scene/view. In some examples, the Building Explorer interface 230 can include an incident selection UI element 232 the selection of which automatically jumps to displaying the rendered floor 212 as the floor associated with the 3D location of the reported incident.

The rendered floor 212 can include an overlay or other representation of a floorplan corresponding to the physical layout of the rendered floor 212. For example, FIG. 3 is a diagram illustrating an example user interface 300 including a rendered floorplan of a selected floor. In one illustrative example, the rendered floorplan 212 illustrated in FIG. 3 can be the same as or similar to the opaque rendered floor 212 illustrated in FIG. 2. In some cases, the example 3D mapping and visualization system can automatically toggle between the rendered floor depicted in FIG. 2 (e.g., without a detailed floorplan overlaid on rendered floor 212) and the rendered floor depicted in FIG. 3 (e.g., including the detailed floorplan overlaid on rendered floor 212), based at least in part on a zoom level of the rendered 3D view. For example, the detailed floorplan overlaid on rendered floor 212 may be presented in response to the zoom level of the rendered 3D view being greater than a threshold (e.g., sufficiently zoomed in to be able to view and/or distinguish the details of the floorplan overlay).

In some examples, the detailed floorplan overlay on rendered floor 212 (e.g., as illustrated in FIG. 3) can be automatically generated and/or rendered in response to the zoom level of the current 3D view reaching or surpassing the pre-determined threshold. In some cases, the pre-determined threshold can be dynamic (e.g., based on a resolution of a display used to present the example user interface 300 to a user, based on a window size of a UI viewer on the display, etc.) The detailed floorplan overlay on rendered floor 212 can include one or more location indicators 316. For example, the location indicators 316 can represent the location of fire extinguishers within the real-world space associated with the rendered floorplan 212, although other objects may also be represented by location indicators 316. In some examples, one or more location indicators (e.g., such as location indicators 316) can be used to represent objects or specific locations within the rendered floorplan 212 of which emergency responders may desire awareness of. For example, one or more location indicators (e.g., such as location indicators 316) can be used to represent the location of defibrillators, emergency exits, eye wash stations, hazardous materials, stairwells, safes or vaults, sprinkler systems, alarms, alarm control panels, electrical control panels, etc. In some cases, the location indicators 316 can be overlaid on rendered floorplan 212 such that each location indicator 316 is mapped to a fixed 3D coordinate (e.g., the relative position of location indicators 316 relative to one another, relative to the features of the floorplan 212, and/or relative to the fine-grained emergency location indicator 214) such that the location indicators are depicted in a constant position even as the POV or frame of the rendered 3D scene changes.

Orthographic Projection of Building Interiors

In an emergency response scenario, emergency responders may consume valuable time orienting themselves while inside unfamiliar buildings. This problem can compound for office buildings or other multi-floor structures, in which emergency responders moving floor to floor must orient themselves on each floor and also must orient themselves sufficiently to locate and use stairwells or other means for moving between the floors. Orientation involves the discovery of visually identifiable reference points as landmarks for personal location, and can be a critical process in emergency situations and/or emergency response scenarios.

Maps and mapping data in the form of building floorplans (e.g., such as the rendered floorplan 212 described above with respect to FIGS. 2 and 3) can be useful sources of information for emergency responders, but may be limited based on various factors such as the "freshness" of the data represented in the building floorplan (e.g., as the actual configuration or layout of the building floor and objects thereupon often changes from the time the building floorplan data is submitted, created, obtained, etc.) as well as the completeness or granularity of the data represented in the building floorplan. For instance, many building floor plans are limited to general architectural features such as interior wall locations, and would not include or reflect the location of features such as temporary walls or dividers between cubicles, or various other furnishings that may be installed and/or moved about by the tenant(s) on the particular floor of the building. In other words, building floor plans are often limited to depicting a basic set of fixed or static architectural features (e.g., load-bearing walls, permanent interior walls, windows, etc.), many of which cannot be modified without affecting the structural integrity of the building and/or without requiring a major renovation or remodeling of the building floor interior.

Accordingly, in many examples, existing building floor plan data may have few identifiable features that can be used for reference or orientation by emergency responders, as the existing building floor plan data is largely intended for (and/or limited to) construction purposes. In many cases, the existing building floor plan data does not accurately reflect the realities of the layout of a building interior or building floor, which can vary significantly from the layout of the floor at the time construction is completed/the layout when the bare floor is turned over to a tenant. For instance, existing building floor plan data and/or existing building floor plan representations typically omit details such as furniture, cubicle walls, obstructions, and other fixtures that are critical for orientation on or within the building floor. For example, existing building floor plan data may correspond to a particular floor selected from one or more floors of a building or other structure, including single-level buildings or structures and multi-level buildings or structures. For multi-level buildings or structures, one or more (or all) of the multiple floors may share a common architectural or construction floor plan, which may correspond to permanent features of the floor, such as load-bearing or exterior walls, stairwells, exterior windows, etc. However, in many multi-level structures, and particularly in multi-tenant and/or multi-function structures with multiple levels, the features and layouts present on each particular floor of the multiple floors can vary, sometimes significantly. For example, different floors may have different furniture layouts, different installations of temporary, semi-permanent, and/or permanent features such as cubicles, dividing walls, half-height walls, etc., as described above. Existing building floor plan data may also be insufficient and/or incomplete for single-level structures, such as post offices, banks, trailers, etc., among various other examples. For example, existing building floor plan data for post offices or banks may indicate the locations of external walls, windows, and other architectural and/or engineering features from the time of construction, but may lack information on interior floor features and objects such as counters.

As such, there is a need for systems and techniques that can be used to provide improved building floor representations, including improved 2D representations of a building floor that can be used to provide the rendered floorplan view 212 of FIGS. 2 and 3. In some cases, detailed layout drawings or representations may provide improvements over existing building floorplans based on including additional identifiable interior landmarks that more closely correspond to the actual or current state of the building floor layout. However, like building floorplans, detailed layout drawings still often omit important details that are necessary or useful for orientation, because the layout drawings were intended to portray the placement of only certain items. An additional challenge arises in the fact that building floor maps and layout drawings are typically created based on the proposed placement of objects, and as such, may omit modifications that may have occurred during occupancy. As contemplated herein, these challenges and more can be addressed by the use of three-dimensional interior survey (e.g., 3D model, 3D scan, etc.) of building floors and/or building floor, as the interior survey data can be seen (and used) to articulate the location of actual objects present on the building floor, rather than being limited to the identification of landmarks for orientation.

Systems and techniques are described herein that can be used to provide orthographic projections of the interior of a building, where the orthographic projection comprises a 2D representation generated or otherwise obtained from 3D model and/or scan data of the interior of the building. In one illustrative example, the orthographic projections described herein can be utilized in combination with the example 3D mapping and visualization system(s) described above with respect to FIGS. 1-3. For instance, in some embodiments, the rendered floor view 212 of FIG. 2 and/or FIG. 3 can be an orthographic projection generated from 3D mapping or scan data of a model of the interior of the building (and corresponding to the particular building floor being presented in rendered floor view 212).

Figure 4:
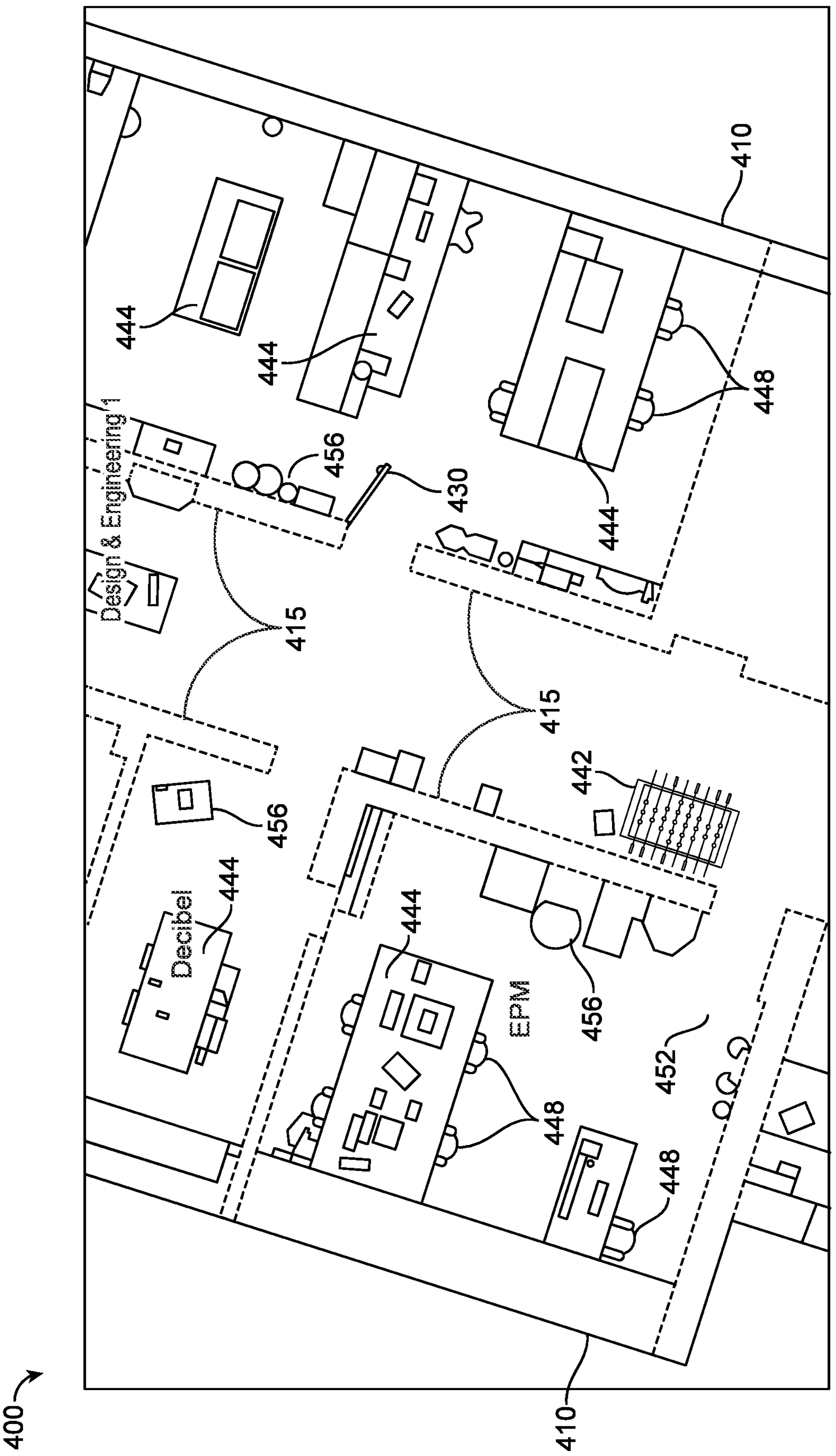
FIG. 4 is a diagram illustrating an example of a two-dimensional projection corresponding to three-dimensional building interior survey data (e.g., 3D scan and/or 3D model data), according to embodiments of the present disclosure.

Further details and examples of the presently disclosed systems and techniques for providing orthographic projections of the interior of a building for emergency response scenarios will be described below with reference to FIGS. 4 and 5. For example, FIG. 4 is a diagram illustrating an example of a two-dimensional projection 400 corresponding to three-dimensional building interior survey data (e.g., 3D scan and/or 3D model data of the particular building floor interior). In one illustrative example, the 2D projection 400 is an orthographic projection of the 3D building interior survey data, as will be described in greater detail below.

Orthographic projection is a technique of graphical projection that can be used to represent three-dimensional objects in a two-dimensional form. In particular, orthographic projection can be performed based on projecting 3D objects or models into a 2D plane, where the 2D planar projection comprises the 2D representation of the 3D objects or models. Orthographic projection is a type of parallel projection, which utilizes a plurality of projection lines parallel to one another. Each projection line connects a 3D point to a corresponding (e.g., projected) 2D point on the projection plane. In orthogonal projection, each projection line of the plurality of projection lines is orthogonal to the projection plane. Other forms of parallel projection include oblique projection, which also utilizes a plurality of parallel projection lines. However, in oblique projection, the projection lines are not orthogonal to the 2D projection plane.

In the context of a 3D scan or model data corresponding to an interior floor of a building, an orthographic projection of the 3D building floor data can be used to generate a top-down view of the floor (e.g., a floor plan view of the building floor), with the ceiling removed from the underlying 3D scan or model data obtained for the building floor. For instance, 3D data acquisition can be performed for one or more (or all) of the floors of a building interior. For instance, 3D data acquisition can be performed for the single floor of a single-floor building or structure. In the example of a multi-floor building or structure, 3D data acquisition can likewise be performed for some (e.g., a subset of floors) or all of the multiple floors within the multi-floor building or structure. Various different data acquisition techniques can be used to obtain the 3D interior survey data of the building, and the 3D interior survey data can comprise a 3D model, a 3D scan or point cloud, 3D imaging, etc.

One or more orthographic projections can be generated based on the 3D interior building survey data. For instance, orthographic projection can begin with selecting or otherwise configuring the two-dimensional projection plane that is to be used to perform the orthographic projection. In the particular example of generating a top-down view of the building floor layout, the 2D projection plane can be configured as the horizontal plane that is parallel to the building floor. Subsequently, orthographic projection can be performed to map the building interior survey 3D data onto the 2D projection plane.

Based on the selection of the 2D projection plane, a plurality of projection lines are extended from each point of the 3D model (or other 3D survey data) orthogonally towards the 2D projection plane. Each projection line intersects the 2D projection plane at a 90° angle, and the corresponding 3D point for the projection line is mapped (e.g., projected) to the intersection point with the 2D projection plane. For instance, some (or all) of the 3D points included in the building survey data can be associated with a corresponding orthogonal projection line and projected 2D point on the projection plane. The intersection points/projected 2D points on the projection plane correspond to the locations of the 3D model's features now represented in two dimensions.

Connecting the 2D projection points can create a flat representation of the 3D objects included in the 3D building interior survey data. When the orthographic projection plane is selected as the horizontal plane parallel to the surface of the floor, the orthographic projection depicts the layout of the interior floor of the building, as seen from above, without any distortion of dimensions. Accordingly, the orthographic projection of the 3D building interior survey data accurately represents the spatial relationships and dimensions of various features and objects that are present on the building floor, including but not limited to exterior walls, interior walls, doors, windows, etc., among various other features or objects associated with the building floor.

For instance, the orthographic projection 400 of FIG. 4 can be seen to provide a top-down representation of the interior layout of a floor of a building, and can be generated based on orthographic projection of 3D scan or survey data of the particular building floor onto a horizontal plane parallel to the floor surface. In some aspects, 3D points corresponding to the ceiling of the building interior can be removed or suppressed within the 3D scan data prior to and/or during the orthographic projection, such that 3D points on the ceiling are not included in the orthographic projection 400 (e.g., as the projection of the 3D points on the ceiling would fill the entire 2D projection plane used for the orthographic projection, thereby obscuring the relevant information representing everything below the ceiling).

In one illustrative example, the orthographic projection 400 depicts a top-down or birds-eye view of the particular building floor in a 2D form that is generated without any distortion of dimensions relative to the underlying 3D building interior scan/survey/model data used for generating the orthographic projection 400. Notably, the orthographic projection 400 accurately represents the spatial relationships and dimensions of various features and objects that are present on the building floor and included in the 3D scan or interior survey data. For instance, spatial relationships and dimensions are maintained in the 2D orthographic projection 400 for the building exterior walls 410, interior walls or dividers 415, desks or tables 444, chairs 448, etc.

Because the orthographic projection 400 is generated from a full 3D scan or interior survey for the particular building floor, the orthographic projection 400 can include an accurate representation of every object that is detected in or otherwise included in the 3D scan data. For instance, the 2D orthographic projection 400 can additionally include and/or depict a representation of a game table 442 in an interior hallway, doors 430, carpets 452, and various other miscellaneous objects 456, etc.

Notably, the orthographic projection 400 is generated from an actual three-dimensional survey of the same building floor interior that is the subject of the representation of orthographic projection 400. Accordingly, the orthographic projection 400 visually represents each element on or within the building floor interior as they are witnessed at the time of the underlying 3D scan or survey, as opposed to representing elements as they were planned (e.g., as is the case for existing approaches such as floorplans, layout drawings or diagrams, etc.).

In some aspects, the 2D orthographic projection 400 can be generated or otherwise obtained as a 2D projection that simplifies the building interior imagery in a manner that renders landmarks and/or other objects of interest easier to understand and identify as a reference (e.g., as a reference for orientation, a reference for emergency responders, a reference for emergency response scenarios, etc.). In some embodiments, the 2D orthographic projection 400 can include one or more visual overlays indicative of different types or classes of landmarks, objects, features, etc., and may include one or more visual overlay elements the same as or similar to the landmarks 214 and/or 316 variously described above with respect to the examples of FIG. 2 and/or FIG. 3.

In one illustrative example, a 2D orthographic projection can be generated, obtained, and/or stored corresponding to each floor of one or more floors (e.g., a single floor of a single floor building or structure, multiple floors of a multiple floor building or structure, a plurality of floors of a building or structure having a plurality of floors, etc.) included in a building or other structure (e.g., a single-level structure, a multi-level structure, etc.). For instance, a corresponding 2D orthographic projection (e.g., such as 2D orthographic projection 400) can be obtained for each floor of a plurality of mapped floors associated with the example 3D mapping and visualization system described above with respect to FIGS. 1-3.

Figure 5:
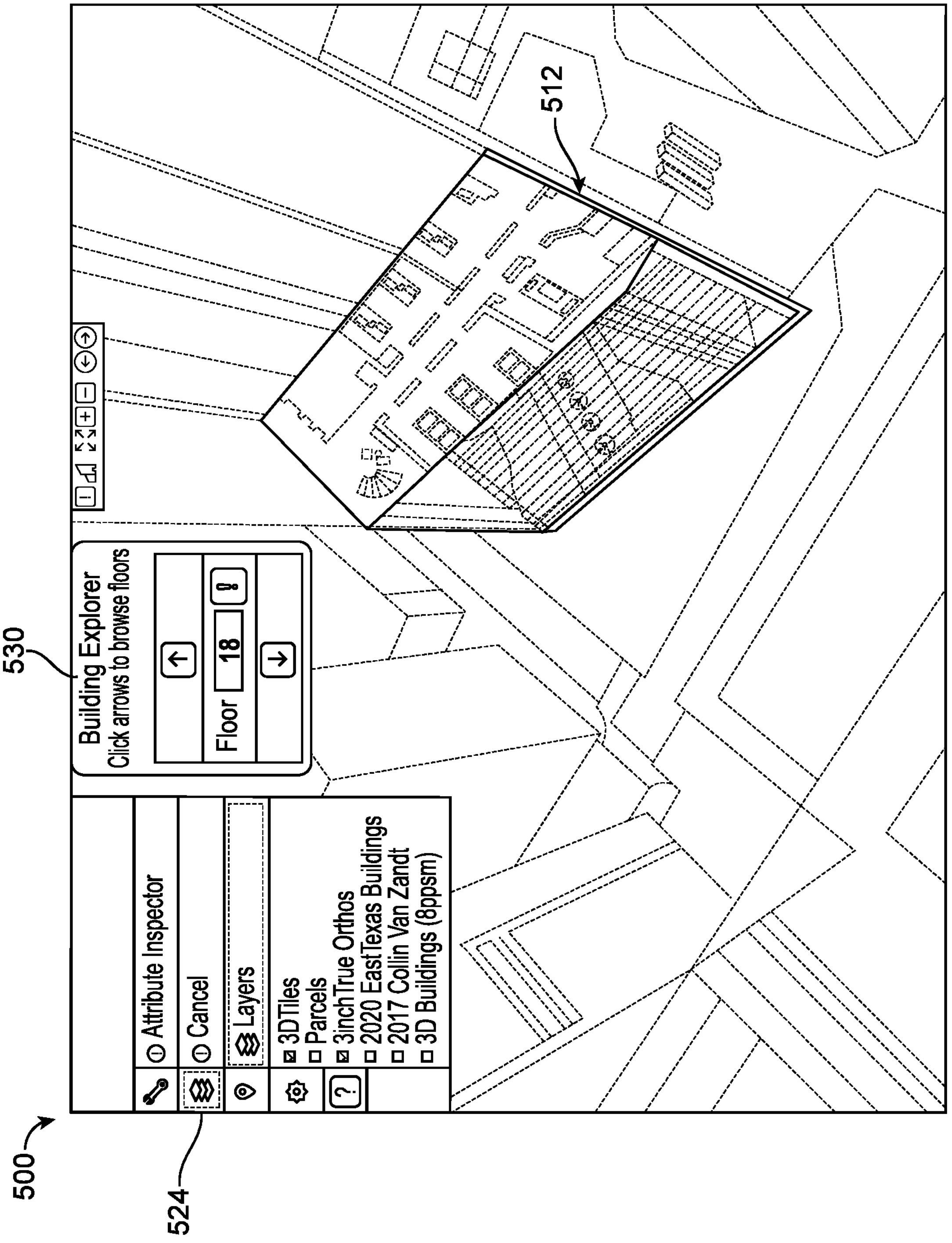
FIG. 5 is a diagram illustrating an example user interface of a 3D mapping and visualization system including a top-down view orthographic projection of a selected floor, according to embodiments of the present disclosure.

FIG. 5 is a diagram illustrating an example user interface 500 including an orthographic projection 512 of a selected floor, according to embodiments of the present disclosure. In some aspects, the example user interface 500 of FIG. 5 can be the same as or similar to the example user interface 300 of FIG. 3. For instance, the example user interface 500 of FIG. 5 can include a layer selection control element 524 that is the same as or similar to the layer selection control element 224 shown in FIGS. 2 and 3. The example user interface 500 of FIG. 5 can additionally include a floor selection interface 530 that is the same as or similar to the floor selection interface 2309 shown in FIGS. 2 and 3, etc.

In some embodiments, the rendered floorplan view 212 of FIG. 2 can, in at least some embodiments, comprise the orthographic projection 512 of the selected floor. The orthographic projection 512 can be a top-down orthographic projection generated from 3D scan or interior survey data corresponding to the selected floor (e.g., a 2D orthographic projection of the 3D interior survey data, with points on the ceiling removed or omitted, as described above with respect to FIG. 4). In one illustrative example, the orthographic projection 512 of FIG. 5 can be the same as or similar to the orthographic projection 400 of FIG. 4.

In some aspects, the 2D orthographic projection 400 of FIGS. 4 and/or 512 of FIG. 5 can include a representation of each element or object that is included in the underlying 3D scan or interior survey data used to generate the top-down view orthographic projection described herein. In some examples, the orthographic projection may be modified or simplified, for instance simplified to make landmarks easier to understand and identify as a reference for orientation, as noted above. In some cases, one or more visual overlays can be combined with the top-down view orthographic projection 400/512. For instance, textual overlay information can be provided to indicate different rooms, regions, or areas of the particular floor layout. As shown in the example top-down view orthographic projection 400 of FIG. 4, textual overlay information can be added indicative of room names, such as 'EPM,' 'Decibel,' 'Design & Engineering 1,' etc. As shown in the example top-down view orthographic projection 512 of FIG. 5, textual overlay information can be added indicative of room names or labeled regions/areas of the particular floor layout, such as 'Solution Factory' or 'Mapping & Perception,' etc.

In some embodiments, the presently disclosed top-down view orthographic projections can be generated or obtained for each floor of one or more floors and/or a plurality of floors that are mapped for a given building or other structure having one or more levels (e.g., including single-level structures, multi-level structures, etc.). For instance, a top-down view orthographic projection can be generated for each floor for which corresponding 3D scan or other 3D interior survey data is available. In some cases, one or more freshness or time-based thresholds can be applied to ensure that the orthographic projections of floor survey data is within a maximum age limit (e.g., 3D scan or interior survey data obtained within the last 90, 180, 365 days, etc.). In some cases, the 3D scan or interior survey data can be obtained and used to generate the top-down view orthographic projection(s) 400, 512 directly, without intermediate processing or data augmentation operations. For instance, if the 3D scan or interior survey data comprises raw point cloud data, in some aspects the corresponding floor-level top-down view orthographic projections can be generated directly from the raw point cloud data. In some embodiments, one or more data processing or pre-processing operations can be applied to or otherwise performed for the 3D scan or interior survey data, before then generating the floor-level top-down view orthographic projections from the processed 3D scan or interior survey data. In some embodiments, the top-down view orthographic projections utilized by the systems and techniques described herein can utilize and include the full level of detail included in the underlying 3D scans or interior survey data used for generating the orthographic projections. For instance, the orthographic projections can be generated to be as close to photo quality data as is possible or available for the underlying 3D scan or interior survey data used as input to the orthographic projection.

In some embodiments, the systems and techniques for 3D mapping and visualization can include, implement, or otherwise utilize top-down view orthographic projections (e.g., such as orthographic projection 400 of FIGS. 4 and/or 512 of FIG. 5, etc.) based on 3D scan or building interior survey data that is obtained from one or more external sources. For example, the 3D scan or building interior survey data for one or more floors can be obtained from the building owner or tenant(s) associated with one or more floors that are to be mapped and visualized according to aspects of the present disclosure. In some cases, the system can be configured to obtain 3D scan or building interior survey data as input, and thereby generate the floor-level (e.g., floor-specific) top-down view orthographic projections. In some examples, the floor-level top-down view orthographic projections can themselves be obtained from one or more external sources and/or databases, and can be coupled to the 3D mapping and visualization system, wherein the 3D mapping and visualization system is configured to generate UI views based on retrieving or obtaining from the database(s) the relevant floor-level top-down orthographic views for rendering the requested UI views. For instance, to generate the UI view 500 of FIG. 5, the system can obtain or retrieve from a database (e.g., a remote or local database of the underlying 3D mapping and visualization system, etc.) the relevant top-down view orthographic view 512 corresponding to the selected floor level (e.g., floor 18, configured by the user via the floor selection interface 530, etc.).

As noted previously, the top-down orthographic views disclosed herein can include an increased level of detail and granularity relative to existing floorplan or other mapping approaches. For instance, where a building floorplan or layout diagram may simply refer to a large open space in the floorplan as 'Cafeteria', with no further detail of landmarks and the relative positioning thereof, the presently disclosed top-down orthographic projections can include the same level of detail and granularity as is captured in a high-resolution 3D scan or interior survey data collected for that particular floor level. Accordingly, continuing in the example above, the top-down view orthographic projection can include more detailed landmark information of objects within the 'cafeteria' space, for instance indicating large (or small) cupboards and/or other identifying landmarks, table layout information, dividers for waiting lines, and/or other critical information necessary or useful for a first responder to more quickly and accurately identify their location in relation to the landmarks within the cafeteria area.

In some embodiments, the underlying 3D scan or building interior survey data (and/or the top-down view orthographic projections themselves) can be obtained from a plurality of different sources and/or providers of mapping data. In some cases, the underlying 3D scans, building interior survey data, and/or orthographic projections can be obtained as geographically referenced image data, such that the systems and techniques can reference each data object to a reference coordinate system and/or can scale the data to fit the rendered UI view(s) (e.g., such as the UI view 500 of FIG. 5, etc.) as needed or as appropriate. In some cases, 3D scan or building interior survey data may be collected using a first coordinate system, and can be reprojected to a second coordinate system prior to generating the orthographic projections for the respective floors of a building or other multi-level structure (e.g., where the second coordinate system that is the target of the reprojection is the same coordinate system as used in the floor-level orthographic projection(s)).

In some aspects, the systems and techniques described herein can be utilized to provide detailed and spatially accurate top-down view orthographic projections of various indoor environments, which can include but are not limited to building floor interiors or building floor layouts, as have been described in the context of the examples above. It is noted that the use of the top-down view orthographic reprojections in the context of building floor views is provided for purposes of illustration and example, and is not intended to be construed as limiting. The systems and techniques described herein can be utilized with various other indoor environments to generate top-down view orthographic projections indicative of indoor landmarks for orientation and/or emergency response, without departing from the scope of the present disclosure.

Figure 6:
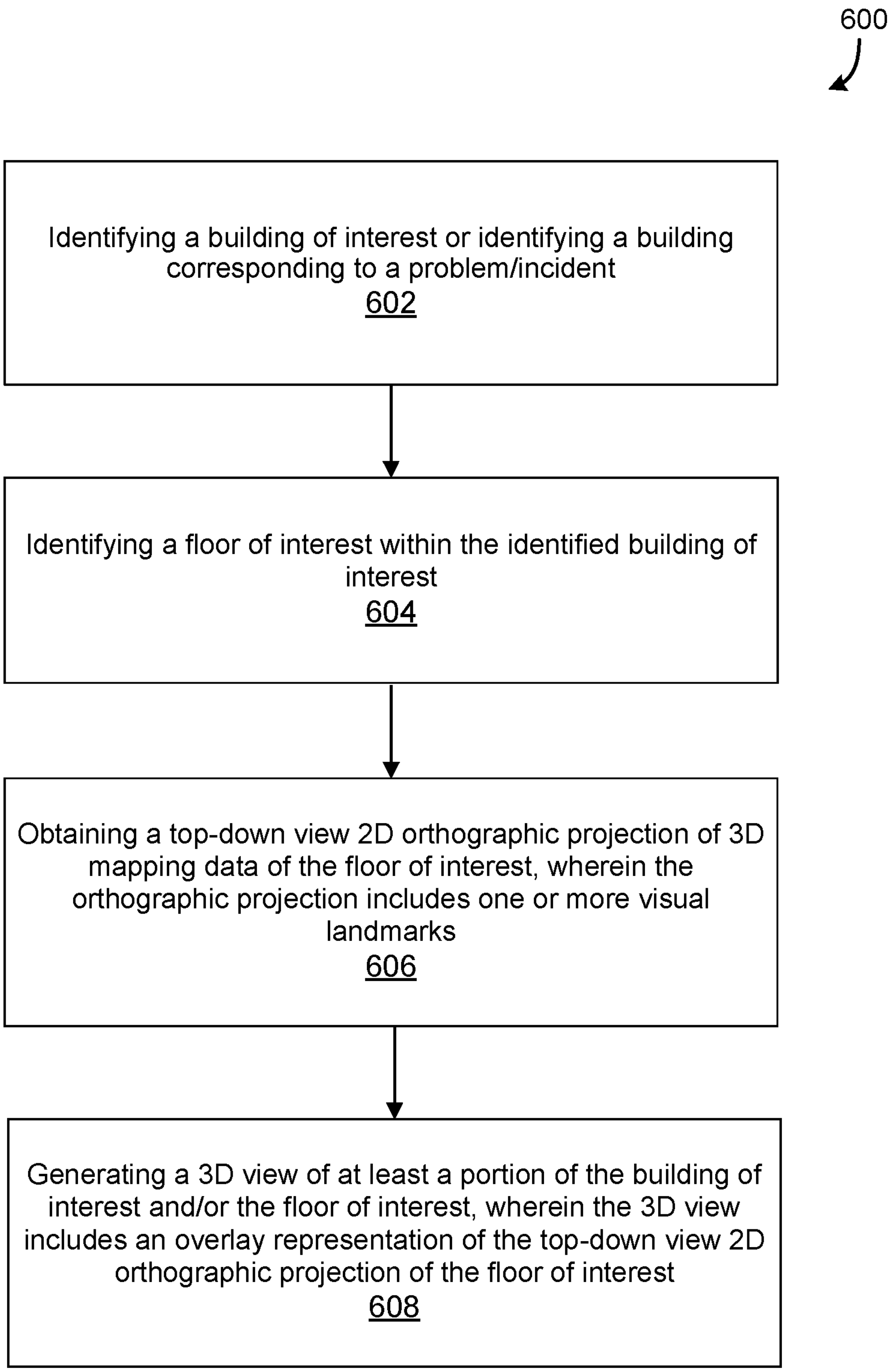
FIG. 6 is a flow diagram illustrating an example of a process for using orthographic projection information of a building floor interior, in accordance with some examples.

FIG. 6 is a flowchart diagram illustrating an example of a process 600 for using orthographic projection information of a selected floor of plurality of building floor interiors, in accordance with some examples. For example, at block 602, the process 600 can include identifying a building of interest or identifying a building corresponding to a reported problem and/or incident in an emergency response scenario. In one illustrative example, the systems and techniques described herein can begin from an identification of a general building or floor within the building, rather than requiring a specific location of interest as an initial input. For instance, as will be described in greater depth below, the floor-level top-down view 2D orthographic projections and associated visual landmarks depicted therein can be utilized to implement the localization and orientation process in reverse-beginning with the building and floor of interest, and subsequently utilizing the visual landmarks depicted within the top-down orthographic projection view to determine the exact location of interest (e.g., the location of an emergency incident, etc.).

In some cases, the building of interest can be identified based on receiving information associated with or indicative of an emergency or other incident triggering an emergency response. In some embodiments, the initial location information may be estimated location information, or otherwise non-exact location information (e.g., exact location may be approximate and/or unknown). In some examples, the initial location information can be determined based on position estimates associated with one or more phone calls reporting the emergency or incident. In some cases, the initial location information can be mapped to location information (e.g., location areas, regions, ranges, etc.) corresponding to different buildings of a plurality of buildings registered with or otherwise mapped by the system.

At block 604, the process 600 can include identifying a floor of interest within the identified building of interest. In some cases, the floor of interest can be identified manually, for instance based on a manual input to the system by a telephone operator or other individual receiving or reviewing one or more calls reporting the incident or emergency. In some examples, the floor of interest can be identified based on an active user selection or input to the system indicative of the floor of interest. For instance, the floor of interest can be determined based on a user input to the building explorer or floor selection interface element 530 of FIG. 5 (e.g., which can be the same as or similar to the building explorer/floor selection interface element 230 of FIGS. 2 and 3, etc.).

In some cases, the floor of interest can be estimated based on a height estimate or z-axis component corresponding to or included in the initial location information or initial location estimate. For example, when the initial location information is based on positioning estimates for one or more phone calls reporting the emergency or incident, the floor of interest can be estimated based on an estimated height of the calling party reporting the emergency or incident (e.g., with the estimated height of the calling party based on triangulation using multiple cellular network towers or base stations, etc., among various other positioning and/or height estimation techniques). In some examples, one or more floors of interest can be identified. For instance, a most probable floor of interest can be identified as corresponding to the reported emergency or incident, and the identification may additionally include one or more floors above and/or below the most probable floor of interest.

At block 606, the process 600 can include obtaining a top-down view 2D orthographic projection of 3D mapping data of the floor of interest, wherein the orthographic projection includes one or more visual landmarks.

In one illustrative example, the top-down view 2D orthographic projection can be the same as or similar to one or more of the orthographic projection 400 of FIG. 4 and/or the orthographic projection 512 of FIG. 5. In some cases, the orthographic projection can be obtained from a database or other data storage element(s) associated with and/or included in the 3D mapping and visualization system. The orthographic projection can correspond to the floor of interest identified at block 604. In some examples, the orthographic projection can be obtained or retrieved from a database or other storage associated with the system, based on querying the database for the floor-level orthographic projection corresponding to the particular one or more floors of interest identified at block 604.

In some aspects, the 2D orthographic projections of the building floor interiors can be pre-computed and stored for use by the system. In some cases, at block 606, the process 600 includes determining whether the floor-level top-down view 2D orthographic projection is already available (e.g., stored in a database, previously computed, determined, or otherwise obtained, etc.) for the one or more floors of interest identified at block 604. If it is determined that the requested orthographic projection(s) are not already stored or available for the identified floor(s) of interest, block 606 can include using the system to generate (and store) the corresponding orthographic projection information for the floor(s) of interest.

For example, in some aspects, obtaining the top-down view 2D orthographic projection comprises obtaining one or more portions of 3D mapping data corresponding to one or more (or both) of the location information determined at block 602 and/or the location information determined at block 604. For instance, one or more portions of 3D mapping data can be obtained corresponding to the identified building of interest (e.g., from block 602) and/or can be obtained corresponding to the identified floor of interest (e.g., from block 604). In one illustrative example, the one or more portions of 3D mapping data can comprise a 3D model of the floor of interest, a 3D scan or point cloud of the floor of interest, and/or various other building interior survey data corresponding to the floor of interest.

Obtaining the top-down view 2D orthographic projection can further comprise generating an orthographic projection of a top-down view of the obtained 3D mapping data corresponding to the floor of interest. For example, the 3D mapping data corresponding to the floor of interest can be orthographically projected onto a horizontal projection plane that is parallel to (and/or coplanar with) the surface of the floor on the particular building floor of interest identified at block 604.

In one illustrative example, the top-down view 2D orthographic projection for the identified floor of interest (e.g., whether obtained from a database or generated at block 606) can include one or more visual landmarks located on or within the selected floor. The visual landmarks can be depicted in the 2D orthographic projection at spatially accurate positions and relative distances from other visual landmarks or identifying features of the selected floor of interest, as has been described previously above. The visual landmarks can be utilized for general orientation on or within the selected floor, and based on the orientation, a more precise or exact location information or coordinate can be determined or otherwise identified for the emergency or other incident triggering the visualization process 600 (e.g., the emergency or incident discussed above with respect to block 602 of the process 600).

At block 608, the process 600 includes generating a 3D view of at least a portion of the building of interest and/or the floor of interest, wherein the 3D view includes an overlay representation of the top-down view 2D orthographic projection of the floor of interest. For example, the generated 3D view can be the same as or similar to the UI view 500 of FIG. 5, and the overlay representation of the top-down view 2D orthographic projection of the floor of interest can be the same as or similar to one or more of the orthographic projection 512 of FIG. 5 and/or the orthographic projection 400 of FIG. 4.

Notably, the systems and techniques described herein can be used to provide or obtain visualization from a combination of a top-down view and a two-dimensional orthographic projection of survey data, including building exterior survey data and building interior survey data (e.g., floor level 3D scans and/or models, etc.). Using the combination of the top-down view and/or 3D view, along with the presently disclosed 2D orthographic projection views corresponding to specific floors of a building, the systems and techniques described herein can be used (e.g., by emergency responders, or other users of the 3D mapping and visualization system) to identify a location of interest from nearby landmarks, rather than performing the reverse as would be conventionally or otherwise required (e.g., finding a location, and subsequently identifying landmarks nearby or corresponding to the already-identified location). Notably, the top-down view 2D orthographic projections corresponding to a selected or identified building floor can include the plurality of visual landmarks described above, which may be used to perform or enable the identification of the location of interest based on landmarks on or within a particular floor.

Figure 7:
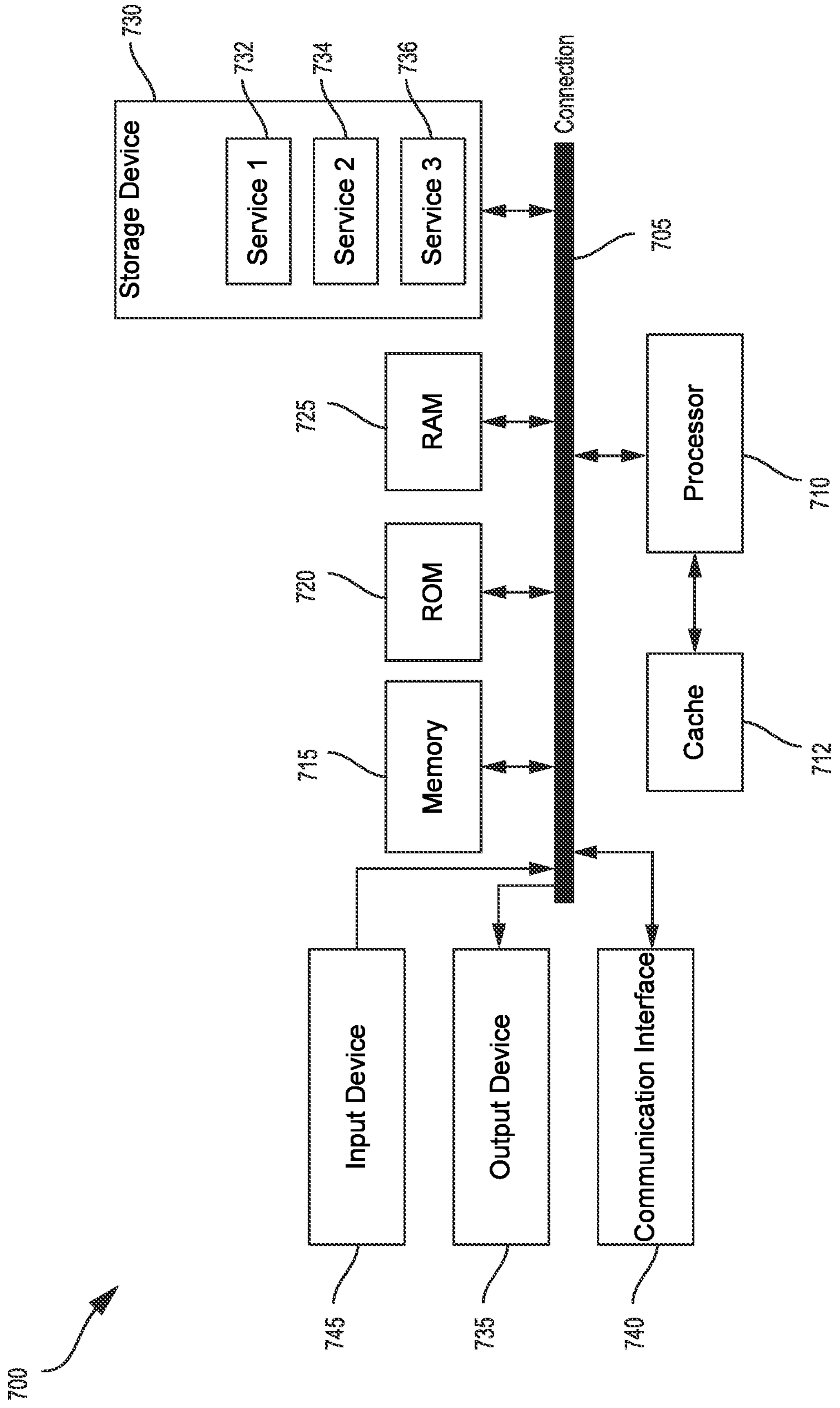
FIG. 7 is a block diagram illustrating an example of a computing system for implementing certain embodiments of the present technology, according to embodiments of the present disclosure.

The operations of the process 600 may be implemented as software components that are executed and run on one or more processors (e.g., processor 710 of FIG. 7 or other processor(s)). In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 600 is illustrated as a logical flow diagram, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 600 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 7 is a diagram illustrating an example of a system for implementing certain aspects of the present technology. In particular, FIG. 7 illustrates an example of computing system 700, which may be for example any computing device making up internal computing system, a remote computing system, a camera, or any component thereof in which the components of the system are in communication with each other using connection 705. Connection 705 may be a physical connection using a bus, or a direct connection into processor 710, such as in a chipset architecture. Connection 705 may also be a virtual connection, networked connection, or logical connection.

In some aspects, computing system 700 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 700 includes at least one processing unit (CPU or processor) 710 and connection 705 that communicatively couples various system components including system memory 715, such as read-only memory (ROM) 720 and random access memory (RAM) 725 to processor 710. Computing system 700 may include a cache 715 of high-speed memory connected directly with, in close proximity to, or integrated as part of processor 710.

Processor 710 may include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which may represent any number of input mechanisms, such as a microphone for speech, a touch-sensitive screen for gesture or graphical input, keyboard, mouse, motion input, speech, etc. Computing system 700 may also include output device 735, which may be one or more of a number of output mechanisms. In some instances, multimodal systems may enable a user to provide multiple types of input/output to communicate with computing system 700.

Computing system 700 may include communications interface 740, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 730 may include software services, servers, services, etc., that when the code that defines such software is executed by the processor 710, it causes the system to perform a function. In some aspects, a hardware service that performs a particular function may include the software component stored in a computer-readable medium in connection with the necessary hardware components, such as processor 710, connection 705, output device 735, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

What is claimed is:

1. A method comprising:

identifying a building of interest, wherein the building of interest is associated with an emergency incident or emergency incident report, and is an unfamiliar building for emergency responders;

determining a particular floor within the building of interest, wherein the particular floor is included in one or more floors of the building of interest;

obtaining a top-down view two-dimensional (2D) orthographic projection of three-dimensional (3D) interior survey data corresponding to the particular floor, wherein the top-down view 2D orthographic projection includes one or more visual landmarks; and generating a 3D view of at least a portion of the building of interest to provide visualization information to the emergency responders, wherein the 3D view is different from the 3D interior survey data, and includes a graphical overlay representation of the top-down view 2D orthographic projection of the particular floor rendered within the 3D view, and wherein the 3D view includes one or more control elements for manipulating the 3D view, wherein the top-down view 2D orthographic projection is generated from a portion of the 3D interior survey data associated with respective 3D height coordinates less than or equal to a configured threshold height value, and wherein the portion of the 3D interior survey data excludes 3D points or 3D data associated with light fixtures or ceiling-mounted objects represented in the 3D interior survey data.

2. The method of claim 1, further comprising:

outputting the generated 3D view in response to a request for visualization information or orientation information for determining a location of the emergency incident.

3. The method of claim 2, further comprising:

receiving location information indicative of the location of the emergency incident within the particular floor, wherein the location information is based on one or more of the visual landmarks included in the overlay representation of the top-down view 2D orthographic projection.

4. The method of claim 1, wherein the top-down view 2D orthographic projection is obtained based on using an identifier of the particular floor to query a database, wherein the database includes a respective top-down view 2D orthographic projection corresponding to each floor of the one or more floors of the building of interest.

5. The method of claim 1, wherein obtaining the top-down view 2D orthographic projection comprises:

obtaining one or more portions of 3D scan or 3D mapping data corresponding to the particular floor, wherein the one or more portions of 3D scan or 3D mapping data comprise the 3D interior survey data; and performing orthographic projection of the one or more portions of 3D scan or 3D mapping data onto a 2D projection plane to thereby generate the top-down view 2D orthographic projection.

6. The method of claim 5, wherein the 2D projection plane is a horizontal plane parallel to a floor surface of the particular floor represented in the one or more portions of 3D scan or 3D mapping data.

7. The method of claim 5, wherein the 2D projection plane is a horizontal plane coplanar with a floor surface of the particular floor represented in the one or more portions of 3D scan or 3D mapping data.

8. The method of claim 1, wherein the configured threshold height value is equal to a ceiling height for the particular floor within the building of interest.

9. The method of claim 1, wherein identifying the building of interest is based on a determination that the building of interest corresponds to location information associated with the emergency incident.

10. The method of claim 1, wherein the one or more control elements includes an incident location navigations control element, and where user selection of the incident location navigation control elements causes the 3D view of automatically zoom to a rendered view of a 3D environment surrounding the location of the incident.

11. A system comprising:

one or more processors; and one or more computer-readable storage media having computer-readable instructions stored thereon, wherein the computer-readable instructions, when executed by the one or more processors, cause the one or more processors to:

identify a building of interest, wherein the building of interest is associated with an emergency incident or emergency incident report, and is an unfamiliar building for emergency responders;

determine a particular floor within the building of interest, wherein the particular floor is included in one or more floors of the building of interest;

obtain a top-down view two-dimensional (2D) orthographic projection of three-dimensional (3D) interior survey data corresponding to the particular floor, wherein the top-down view 2D orthographic projection includes one or more visual landmarks; and generate a 3D view of at least a portion of the building of interest to provide visualization information to the emergency responders, wherein the 3D view is different from the 3D interior survey data, and includes a graphical overlay representation of the top-down view 2D orthographic projection of the particular floor rendered within the 3D view, and wherein the 3D view includes one or more control elements for manipulating the 3D view, wherein the top-down view 2D orthographic projection is generated from a portion of the 3D interior survey data associated with respective 3D height coordinates less than or equal to a configured threshold height value, and wherein the portion of the 3D interior survey data excludes 3D points or 3D data associated with light fixtures or ceiling-mounted objects represented in the 3D interior survey data.

12. The system of claim 11, wherein, to obtain the top-down view 2D orthographic projection, the computer-readable instructions cause the one or more processors to:

obtain one or more portions of 3D scan or 3D mapping data corresponding to the particular floor, wherein the one or more portions of 3D scan or 3D mapping data comprise the 3D interior survey data; and perform orthographic projection of the one or more portions of 3D scan or 3D mapping data onto a 2D projection plane to thereby generate the top-down view 2D orthographic projection.

13. The system of claim 12, wherein the 2D projection plane is a horizontal plane parallel to a floor surface of the particular floor represented in the one or more portions of 3D scan or 3D mapping data.

14. The system of claim 12, wherein the 2D projection plane is a horizontal plane coplanar with a floor surface of the particular floor represented in the one or more portions of 3D scan or 3D mapping data.

15. The system of claim 12, wherein the 2D projection plane is a horizontal plane parallel to a floor surface of the particular floor represented in the one or more portions of 3D scan or 3D mapping data.

16. The system of claim 12, wherein the 2D projection plane is a horizontal plane coplanar with a floor surface of the particular floor represented in the one or more portions of 3D scan or 3D mapping data.

17. The system of claim 11, wherein the configured threshold height value is equal to a ceiling height for the particular floor within the building of interest.

18. The system of claim 11, wherein the one or more control elements includes an incident location navigations control element, and where user selection of the incident location navigation control elements causes the 3D view of automatically zoom to a rendered view of a 3D environment surrounding the location of the incident.

19. One or more non-transitory computer-readable media comprising computer-readable instructions, which when executed by one or more processors of an emergency response mapping and visualization service, cause the emergency response mapping and visualization service to:

identify a building of interest, wherein the building of interest is associated with an emergency incident or emergency incident report, and is an unfamiliar building for emergency responders;

determine a particular floor within the building of interest, wherein the particular floor is included in one or more floors of the building of interest;

obtain a top-down view two-dimensional (2D) orthographic projection of three-dimensional (3D) interior survey data corresponding to the particular floor, wherein the top-down view 2D orthographic projection includes one or more visual landmarks; and generate a 3D view of at least a portion of the building of interest to provide visualization information to the emergency responders, wherein the 3D view is different from the 3D interior survey data, and includes a graphical overlay representation of the top-down view 2D orthographic projection of the particular floor rendered within the 3D view, and wherein the 3D view includes one or more control elements for manipulating the 3D view, wherein the top-down view 2D orthographic projection is generated from a portion of the 3D interior survey data associated with respective 3D height coordinates less than or equal to a configured threshold height value, and wherein the portion of the 3D interior survey data excludes 3D points or 3D data associated with light fixtures or ceiling-mounted objects represented in the 3D interior survey data.

20. The one or more non-transitory computer-readable media of claim 19, wherein the computer-readable instructions further cause the one emergency response mapping and visualization service to:

obtain one or more portions of 3D scan or 3D mapping data corresponding to the particular floor, wherein the one or more portions of 3D scan or 3D mapping data comprise the 3D interior survey data; and perform orthographic projection of the one or more portions of 3D scan or 3D mapping data onto a 2D projection plane to thereby generate the top-down view 2D orthographic projection.

21. The one or more non-transitory computer-readable media of claim 19, wherein the one or more control elements includes an incident location navigations control element, and where user selection of the incident location navigation control elements causes the 3D view of automatically zoom to a rendered view of a 3D environment surrounding the location of the incident.

* * * * *